United States Patent  
Yu et al.

(10) Patent No.: US 10,578,065 B1  
(45) Date of Patent: Mar. 3, 2020

(54) TWO-STAGE INTAKE AND TWO-STAGE DISCHARGE STRUCTURE OF ELECTRICALLY CONTROLLED PROPORTIONAL VALVE

(71) Applicant: TAIWAN CHELIC CO., LTD., New Taipei (TW)

(72) Inventors: Ping-Cheng Yu, New Taipei (TW); Chih-Sheng Cheng, New Taipei (TW)

(73) Assignee: TAIWAN CHELIC CO., LTD., New Taipei (TW)

(*) Notice: Subject to any disclaimer, the term of this patent is extended or adjusted under 35 U.S.C. 154(b) by 0 days.

(21) Appl. No.: 16/221,607

(22) Filed: Dec. 17, 2018

(30) Foreign Application Priority Data

Oct. 30, 2018 (TW) .............................. 107138330 A

(51) Int. Cl.
F16K 31/02 (2006.01)
F02M 59/46 (2006.01)
F16K 31/06 (2006.01)
F16K 31/40 (2006.01)
G05D 16/16 (2006.01)
F16K 17/10 (2006.01)

(52) U.S. Cl.
CPC ......... F02M 59/466 (2013.01); F16K 17/105 (2013.01); F16K 31/0675 (2013.01); F16K 31/402 (2013.01); G05D 16/163 (2013.01)

(58) Field of Classification Search
CPC . F02M 59/466; F16K 31/0675; F16K 31/402; F16K 17/105; G05D 16/163

USPC ............. 137/487.5, 488, 489.5, 505, 505.15, 137/505.36, 102, 116.3  
See application file for complete search history.

(56) References Cited

U.S. PATENT DOCUMENTS

| 4,961,441 | A | * | 10/1990 | Salter | G05D 16/2053 137/14 |
| 6,032,919 | A | * | 3/2000 | Giacomino | F16K 31/1262 137/596.17 |
| 6,305,401 | B1 | * | 10/2001 | Uehara | G05D 16/2095 137/102 |
| 6,338,358 | B1 | * | 1/2002 | Watanabe | G05D 16/2093 137/102 |
| 6,584,999 | B2 | * | 7/2003 | Inayama | G05D 16/2024 137/487.5 |
| 6,779,541 | B2 | * | 8/2004 | Inayama | G05D 16/2095 137/102 |

(Continued)

Primary Examiner — Minh Q Le  
(74) Attorney, Agent, or Firm — Leong C. Lei

(57) ABSTRACT

A two-stage intake and two-stage discharge structure of an electrically controlled proportional valve includes a depressurization chamber, which is connected with a guide hole passage, a sensing passage, and a discharge passage. The depressurization chamber is provided therein with a primary diaphragm that drives causes a straight rod having a primary entry opening and a secondary entry opening to move. Through detection conducted in the sensing passage, when the pressure is excessively low, the primary diaphragm moves the straight rod downward to carry out a first stage adjustment, in which the discharge electromagnetic valve is operable to adjust the secondary side pressure for control of depressurization. When the primary diaphragm moves the straight rod further downward to carry out a second stage of pressure output, the secondary entry opening is open to enable a large amount of pressure output.

3 Claims, 10 Drawing Sheets

(56) References Cited

U.S. PATENT DOCUMENTS

| | | | | |
|---|---|---|---|---|
| 7,505,818 B1* | 3/2009 | Kohler | ............... | G05B 11/28 |
| | | | | 137/102 |
| 8,847,103 B2* | 9/2014 | Retnaswamy | ......... | B23K 10/00 |
| | | | | 219/121.54 |
| 9,062,798 B2* | 6/2015 | Neef | ................. | F16K 47/04 |
| 10,409,298 B2* | 9/2019 | Ponzo | ............ | G05D 16/2013 |
| 2002/0175302 A1* | 11/2002 | Wetzel | ................. | F15C 5/00 |
| | | | | 251/61.1 |
| 2003/0234051 A1* | 12/2003 | Toivonen | ............ | F16K 31/084 |
| | | | | 137/554 |
| 2008/0023662 A1* | 1/2008 | Reinicke | ............ | F16K 15/183 |
| | | | | 251/58 |
| 2011/0132475 A1* | 6/2011 | Eidenschink | ......... | B60T 8/3605 |
| | | | | 137/487.5 |
| 2012/0204974 A1* | 8/2012 | Sakasegawa | ............ | G01F 5/00 |
| | | | | 137/486 |
| 2014/0090725 A1* | 4/2014 | Diaz | ................. | F16K 17/00 |
| | | | | 137/489.5 |
| 2018/0195629 A1* | 7/2018 | Yu | ..................... | F16K 17/18 |

* cited by examiner

TWO-STAGE INTAKE AND TWO-STAGE DISCHARGE STRUCTURE OF ELECTRICALLY CONTROLLED PROPORTIONAL VALVE

(a) TECHNICAL FIELD OF THE INVENTION

A two-stage intake and two-stage discharge structure of an electrically controlled proportional valve, in which, in addition to a guide hole passage, a discharge passage, and a sensing passage, a valve seat also comprises a primary diaphragm that comprises a reversal prevention valve and a straight rod having a primary entry opening and a secondary entry opening, the valve seat being provided, on an external side thereof, with an intake electromagnetic valve in connection with the guide hole passage, a discharge electromagnetic valve in connection with the discharge passage, and a sensor in connection with the sensing passage, wherein primary side pressure, when entering a depressurization chamber through the intake electromagnetic valve by way of the guide hole passage, drives the primary diaphragm to move he straight rod downward to open the primary entry opening, and excessive pressure is discharged through the reversal prevention valve to the discharge passage, and the sensor detects data of secondary side pressure flowing in the sensing passage, so as to adjust the time and discharge rate for depressurization, allowing the primary entry opening to achieve accurate adjustment of an output amount of the secondary side pressure, and when the primary diaphragm drives the straight rod downward again to carry out second stage of adjustment, the secondary entry opening is opened and a large amount of output of pressure is achieved with the secondary entry opening, so as to speed up and stabilize accurate adjustment of the output of the secondary side pressure, wherein a first stage discharge structure is defined as extending from the depressurization chamber through the discharge passage to the discharge electromagnetic valve, and a second stage discharge structure is defined as a gas passage hole formed in the straight rod, wherein through the two-stage intake and discharge, the purposes of fast and stabilized output of the secondary side pressure may be achieved.

(b) DESCRIPTION OF THE PRIOR ART

Electrically controlled proportional valves have been widely used in various industries. It is known that stability of power supplied by pneumatic fluid and an output pressure supplied therefrom are determined in accordance with the pressure of the fluid. Thus, to have a stable and consistent output of pressure and to allow for proper control by an electrical control system, electrically control proportional valves have been widely used to control the pressure of pneumatic fluid in order to have the pneumatic fluid well controlled to supply stable and controlled pressure.

Known electrically controlled proportional valves are generally made up of a depressurization chamber, a straight rod, and a diaphragm. Operation of the valves is that a fluid is introduced at an inlet terminal, flowing through a flow passage to the diaphragm to drive the straight rod to move downward, so as to allow the fluid inside the electrically controlled proportional valve to pass through a valve port to reach an output terminal to carry out an adjustment operation. The diaphragm and the straight rod are generally arranged inside the depressurization chamber. For the purposes of easy adjustment, the depressurization chamber is structured to have a chamber height that is slightly greater than a movement stroke of the diaphragm in order to allow for smooth movement of the straight rod. Due to a pressure difference between the diaphragm and the depressurization chamber, a force is induced and acts on the straight rod to maintain a predetermined output flowrate of the fluid so introduced. Thus, it is not possible to make fine and accurate adjustment and application of the introduced fluid pressure. To achieve an optimum use of the introduced fluid, it is desired to have a structure that is capable of adjustment of pressure and also features accurate adjustment.

SUMMARY OF THE INVENTION

The present invention provides a two-stage intake and two-stage discharge structure of an electrically controlled proportional valve of which the primary objective is to provide a primary diaphragm having a reversal prevention valve in a valve seat to form a depressurization chamber. When primary side pressure supplied from the outside passes through a guide hole passage to move, via an intake electromagnetic valve, into the depressurization chamber, the primary diaphragm moves a straight rod downward to open a primary entry opening, and excessive pressure is discharged through a reversal prevention valve to a discharge passage, and a sensor is operable to detect data of secondary side pressure flowing in the sensing passage to activate a depressurization electromagnetic valve for adjusting the response time and discharge rate for depressurization, so as to allow the primary entry opening to provide an output amount for accurate regulation of the secondary side pressure.

When the primary diaphragm causes the straight rod to move further downward for a second stage of adjustment, the primary diaphragm makes the straight rod to move further downward from the previous position so that a secondary entry opening is also opened, allowing for a large amount of pressure output through the secondary entry opening, so as to achieve the purpose of accurate adjustment for rate-increased and stable output of the secondary side pressure.

Another objective of the present invention is to make a flow cross-sectional area of a throttle port smaller than a flow cross-sectional area of an intake electromagnetic valve so as to have the fluid flowing into the depressurization chamber is kept with an effect of increasing pressure with a stable rate, and a size of the space in the center of the depressurization chamber, such as a circular hole area and a circular hole height, can be minimized, to allow the height of the top valve to be effectively reduced, allowing the primary diaphragm to achieve fast balance with the pressure inside the depressurization chamber.

The present invention provides a two-stage intake and two-stage discharge structure of an electrically controlled proportional valve, in which a valve seat that comprises a flow passage is provided, on a top side thereof, with an intake electromagnetic valve, a discharge electromagnetic valve, and a sensor. The flow passage has an inlet end for ingress of primary side pressure and an outlet end for egress of secondary side pressure. The valve seat is provided therein with a primary diaphragm that comprises a reversal prevention valve to define a depressurization chamber. The depressurization chamber is provided with and connected to a guide hole passage that is controlled by the intake electromagnetic valve for connection with the inlet end, a discharge passage that is controlled by the discharge electromagnetic valve to release an excessive pressure, and a sensing passage that is connected to the outlet end for detection conducted with the sensor. Further, a straight rod is additionally provided and arranged in a center of an interior of the valve seat. The straight rod has an external surface sleeved with a straight rod assembly. A primary elastic element and a secondary elastic element are respectively arranged below and corresponding to the straight rod and the straight rod assembly to form a primary entry opening and a secondary entry opening, respectively, so that the straight rod is provided with an arrangement for two-stage opening/closing.

When the sensor detects the secondary side pressure passes through the sensing passage, if the pressure of the outlet end is excessively low, the primary diaphragm drives the straight rod downward to carry out a first stage adjustment, and the discharge electromagnetic valve, through opening of the reversal prevention valve, adjusts the secondary side pressure for control of depressurization so as to allow the primary entry opening to achieve accurate adjustment of an output amount of the secondary side pressure. When the primary diaphragm drives the straight rod downward again to carry out a second stage output of pressure, the secondary entry opening is opened to enable output of pressure with a large amount so as to achieve the purpose of output of the secondary side pressure with increased rate stability.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
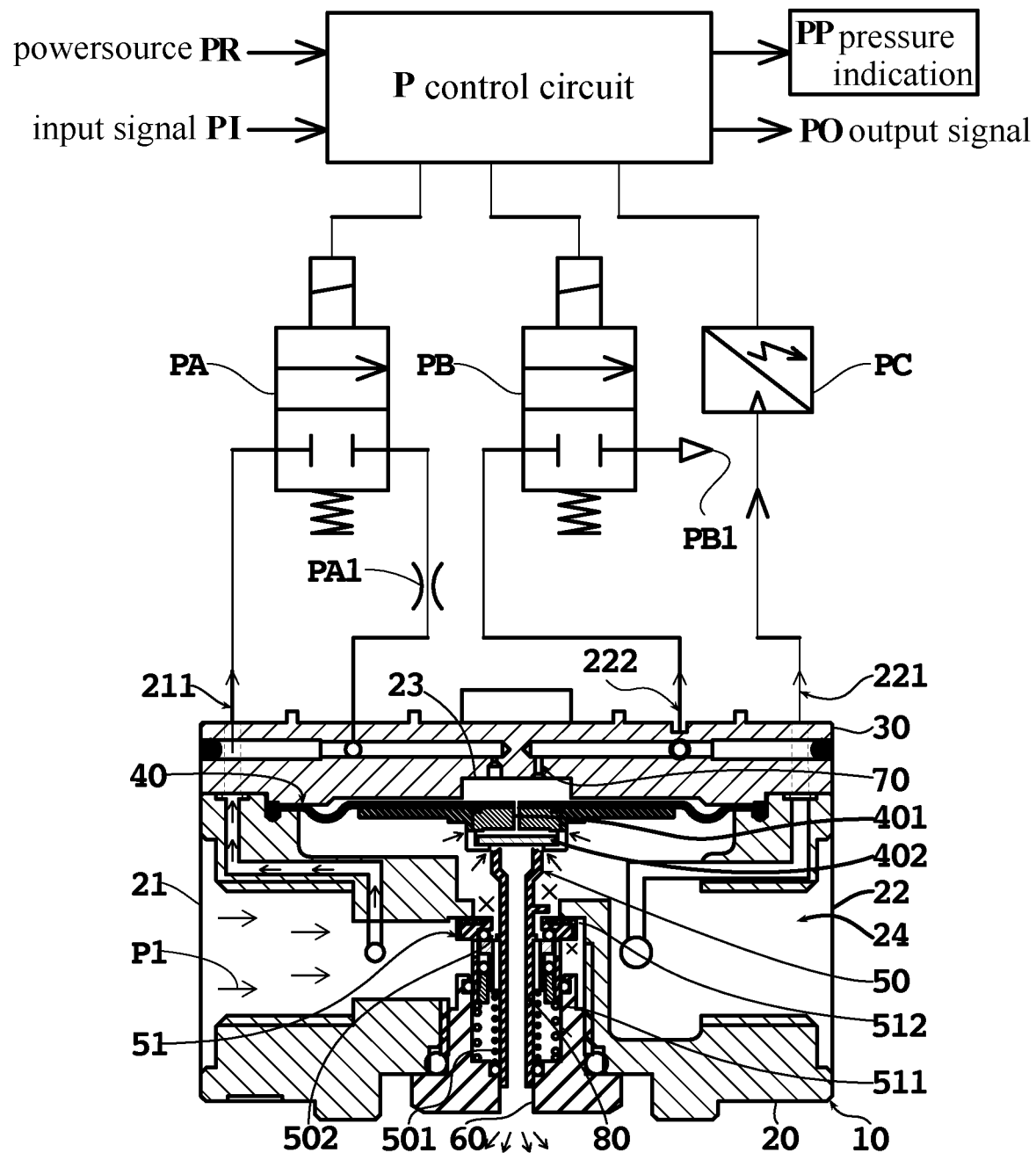
FIG. 1 is a schematic view showing a structure of the present invention.
Figure 2:
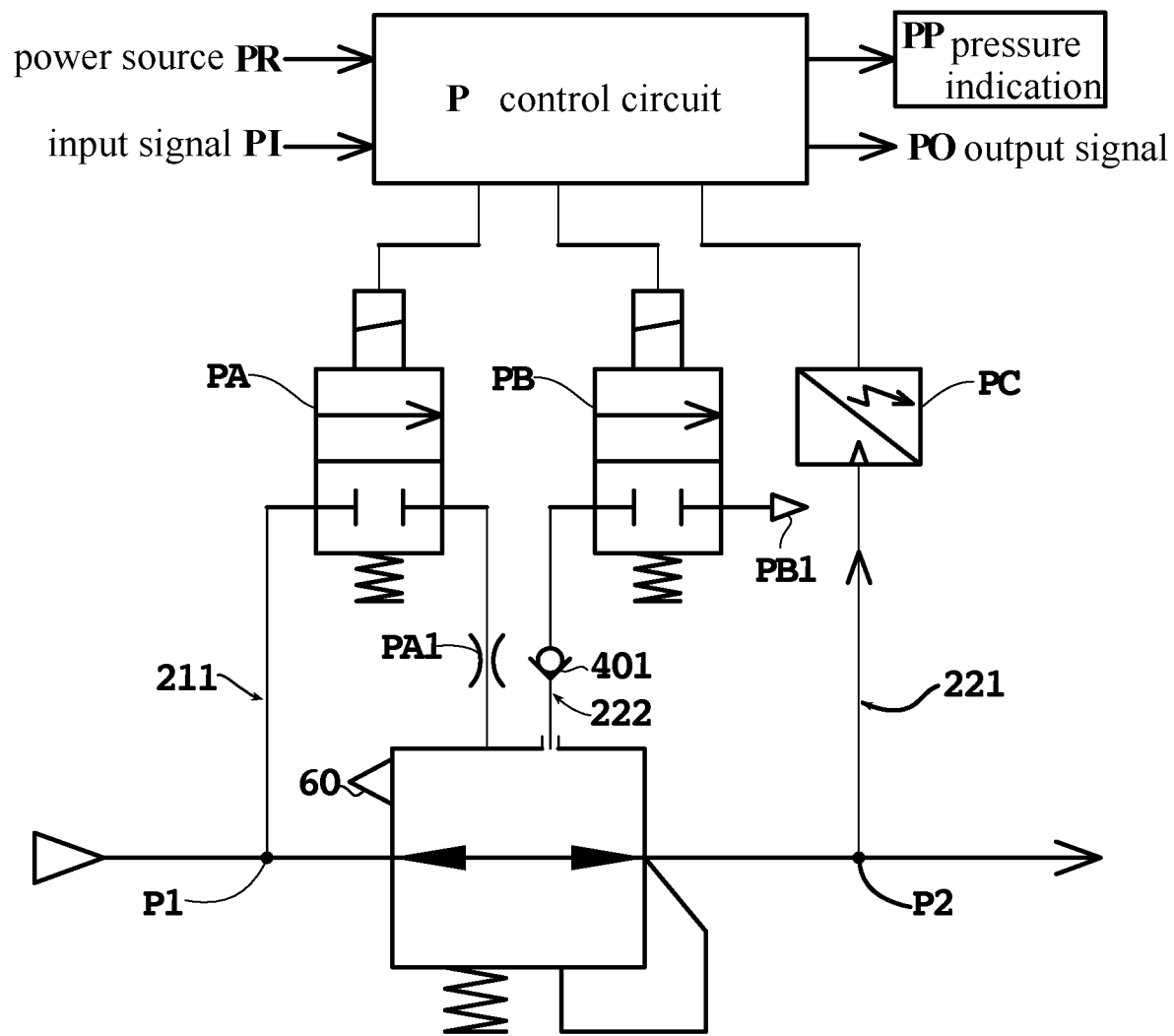
FIG. 2 is a schematic view showing a fluid circuit of the structure of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention will be described with reference to a preferred embodiment, in combination with FIGS. 1-10 of the attached drawings, for better understanding of this invention.

The present invention provides a two-stage intake and two-stage discharge structure of an electrically controlled proportional valve, which structurally comprises: a valve seat (20), which is formed, in an interior thereof, with a flow passage (24), the flow passage (24) having an inlet end (21) for ingress of primary side pressure (P1) and an outlet end (22) for egress of secondary side pressure (P2). The valve seat (20) is provided, on a top side thereof, with a top valve (30) coupled thereto, wherein the top valve (30) is formed therein with passages. The valve seat (20) is also provided, on the top side thereof, with an intake electromagnetic valve (PA), a throttle port (PA1), a discharge electromagnetic valve (PB), and a sensor (PC).

A depressurization chamber (23) is arranged such that, specifically, the depressurization chamber (23) is formed as being sandwiched between the top valve (30), which is combined with the valve seat (20), and a primary diaphragm (40) that comprises a reversal prevention valve (401) and a sealing pad (402). The depressurization chamber (23) is provided, on a top side thereof, with a guide hole passage (211) that is controlled by the intake electromagnetic valve (PA) and the throttle port (PA1) for connection with the inlet end (21), a discharge passage (222) that is controlled by the discharge electromagnetic valve (PB) to release excessive pressure, and a sensing passage (221) that is connected with the outlet end (22) for detection conducted with the sensor (PC), wherein a size of a central space required by the depressurization chamber (23), such as circular hole area and circular hole height, is minimized to allow the primary diaphragm (40) to achieve fast balance with pressure inside the depressurization chamber (23), and speaking more specifically, this is related to adjustment of the balance pressure (Pt) being made fast and efficient, which, together with limitation of an ingress flow rate of the throttle port (PA1) of the primary side pressure (P1) and maintaining an effect of stably increasing pressure, would further shorten opening time of the intake electromagnetic valve (PA), thus making it easier to control a movement stroke of the primary diaphragm (40).

A straight rod (50) is arranged in a central area of an interior of the valve seat (20). The straight rod (50) has an external surface that is sleeved with a straight rod assembly (51). The straight rod (50) is provided, on a lower side thereof, with a primary elastic element (501) to form a primary entry opening (502), and the straight rod assembly (51) is provided with a secondary elastic element (511) to form a secondary entry opening (512), so that the straight rod (50) has an opening/closing arrangement that allows for intake of gas in a two-stage manner.

Further referring to FIG. 1, it can be seen that the top valve (30) is connected, with the top side thereof, with an intake electromagnetic valve (PA), a discharge electromagnetic valve (PB), and a sensor (PC). A control circuit (P) is driven by or energized with a power source (PR) and an input signal (PI) and an output signal (PO) are set. The control circuit (P) displays pressure indication or data (PP).

The intake electromagnetic valve (PA) and the discharge electromagnetic valve (PB) can be driven such that a sensing passage (221) can be established as extending from connection of the outlet end (22) with the top valve (30) to a location in front of the control circuit (P), wherein the sensor (PC) is operable to detect a flow rate in the secondary side pressure (P2), such that in case of being greater than or lower than a predetermined threshold, data are fed back to the control circuit (P) to made judgment or determination between the intake electromagnetic valve (PA) and the discharge electromagnetic valve (PB), where when the secondary side pressure (P2) is excessively high, the discharge electromagnetic valve (PB) and the reversal prevention valve (401) are driven to cause discharge of the secondary side pressure (P2) and the large gas hole (PB1) of the discharge electromagnetic valve (PB) is opened to increase the flow rate; and, on the other hand, when the secondary side pressure (P2) is excessively low, the intake electromagnetic valve (PA) is operated to drive the primary diaphragm (40) to open the primary entry opening (502), allowing the secondary entry opening (512) to achieve the purpose of increasing the secondary side pressure (P2). Better understanding may be obtained by reading the schematic view of FIG. 2 that illustrate an overall fluid circuit of the structure to more clearly illustrate the operation thereof.

Figure 3:
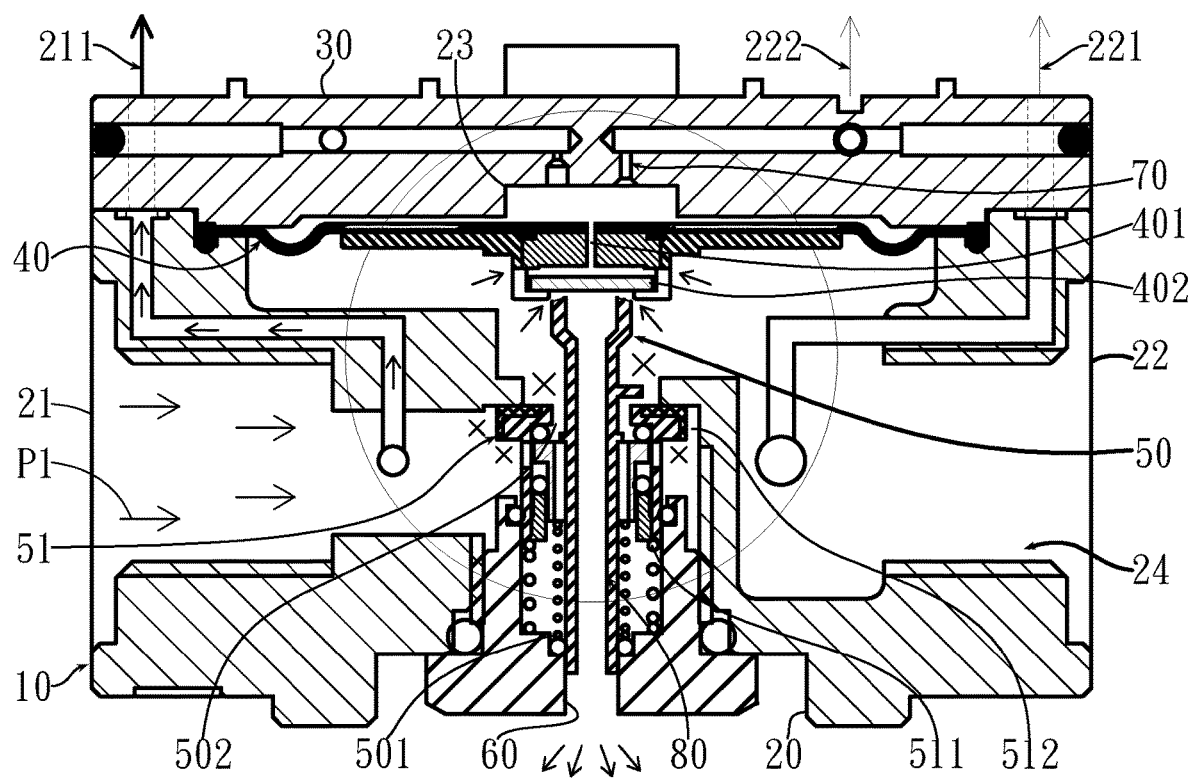
FIG. 3 is a schematic view demonstrating a standby state of operation of the present invention.
Figure 4:
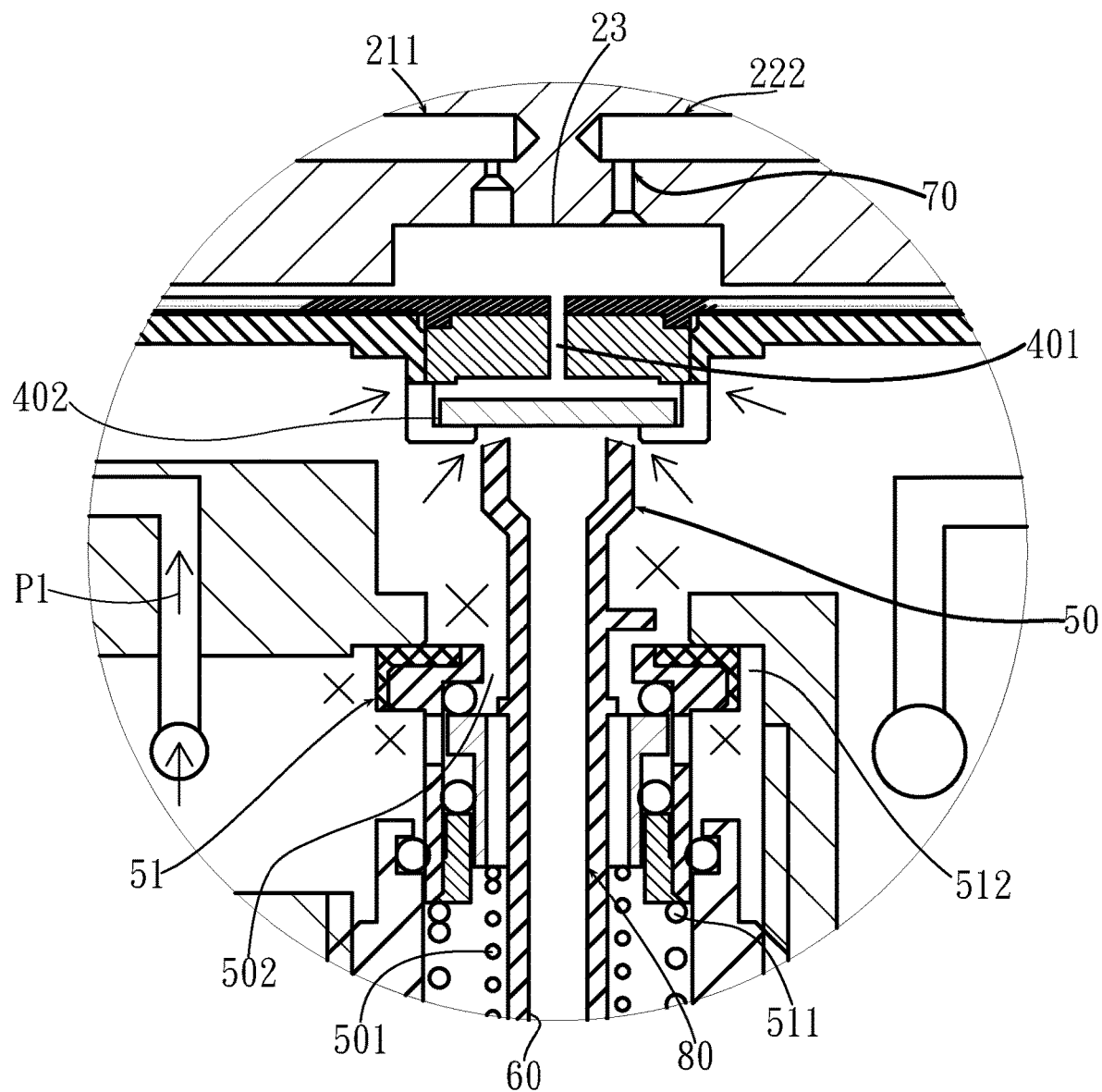
FIG. 4 is an enlarged view of a circled portion of FIG. 3.

Referring to FIGS. 3-4, in a standby state, the intake electromagnetic valve (PA) is in a closed condition and the discharge electromagnetic valve (PB) is in an open condition. After entering the inlet end (21), the primary side pressure (P1) is blocked at the primary entry opening (502) and the secondary entry opening (512) and a part of the primary side pressure (P1) passes through the guide hole passage (211) and flow to the intake electromagnetic valve (PA) but is blocked from flowing into the depressurization chamber (23). In the standby state, the secondary side pressure (P2) is generally equal to zero (=0), while the gas passage hole (60) below the straight rod (50) is open and in communication with the outside.

Figure 5:
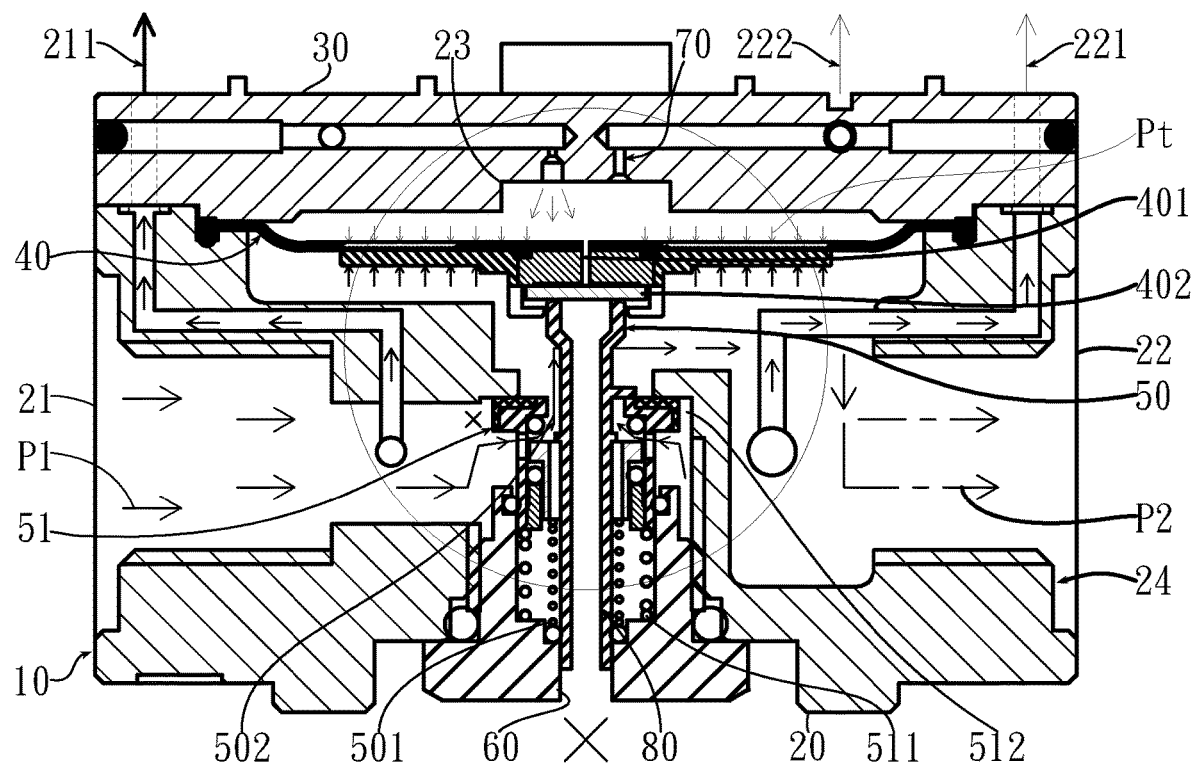
FIG. 5 is a schematic view demonstrating first stage adjustment of the operation of the present invention.
Figure 6:
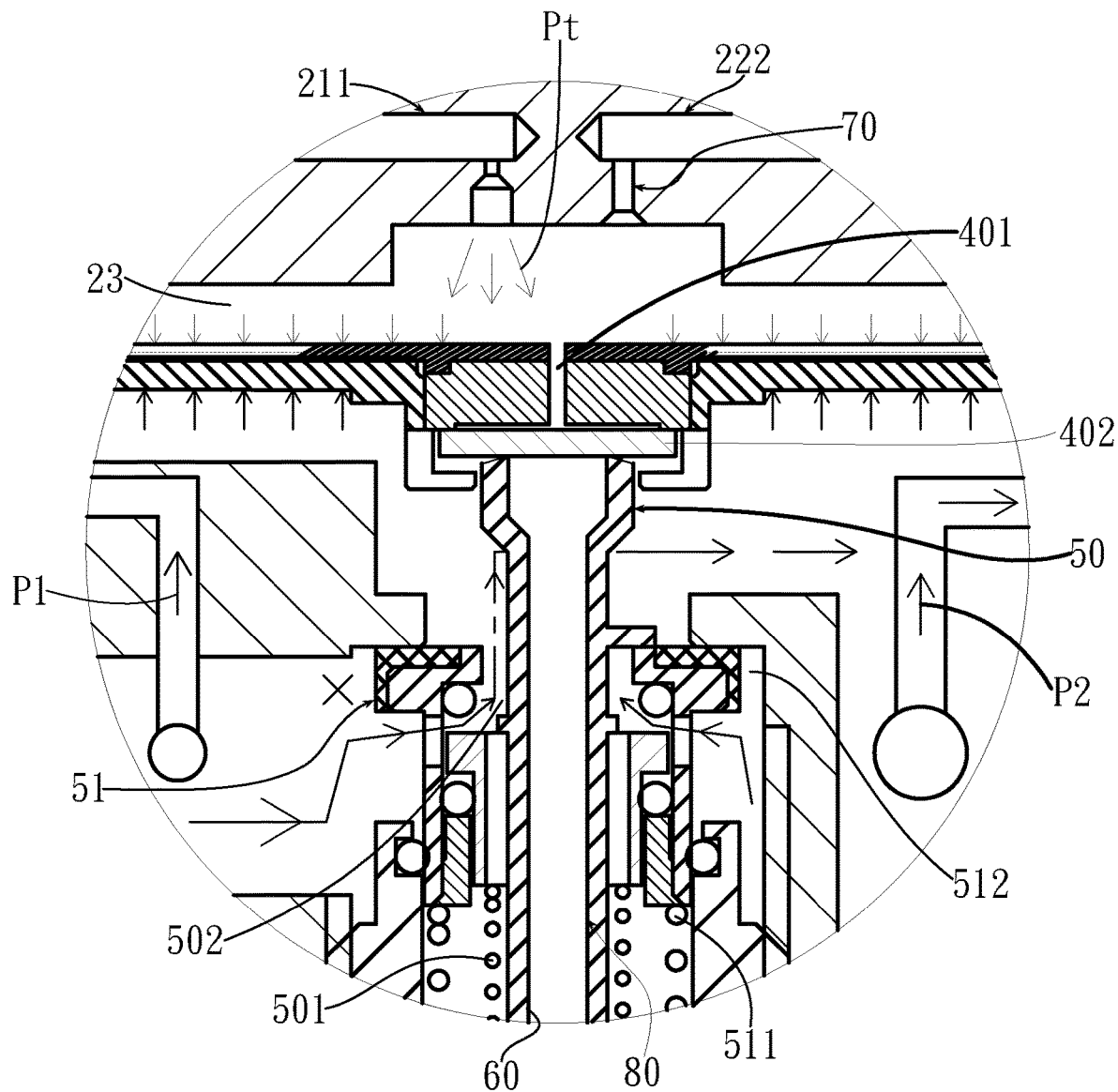
FIG. 6 is an enlarged view of a circled portion of FIG. 5.

Referring to FIGS. 5-6, in a first stage adjustment state after activation, the intake electromagnetic valve (PA) is in an open condition, and the discharge electromagnetic valve (PB) is in a closed condition. The primary side pressure (P1) flows through the guide hole passage (211) and passes through the throttle port (PA1) of the intake electromagnetic valve (PA) to get into the depressurization chamber (23) and forms a balance pressure (Pt) that causes the primary diaphragm (40) to move downward and drives the straight rod (50) in abutting engagement therewith to move downward so as to open the primary entry opening (502). Under such a condition, a first stage discharge structure (70) and a second stage discharge structure (80) are both closed and a part of the primary side pressure (P1) passes through the primary entry opening (502) to form the secondary side pressure (P2) that flows to the outlet end (22). The sensing passage (221), which is arranged at a side corresponding to the outlet end (22), allows a part of the secondary side pressure (P2) to flow to the sensor (PC), such that when the sensor (PC) feeds a signal back to the control circuit (P) for reading and determining the condition of the secondary side pressure (P2) and an operation of judgement or determination is made between the intake electromagnetic valve (PA) and the discharge electromagnetic valve (PB), so that when the secondary side pressure (P2) is excessively high, an instruction is fed to the discharge electromagnetic valve (PB) to conduct an operation of gas discharge for pressure releasing. In the first stage adjustment state, the secondary side pressure (P2) is greater than zero (>0), while the gas passage hole (60) below the straight rod (50) is in a closed condition.

Figure 7:
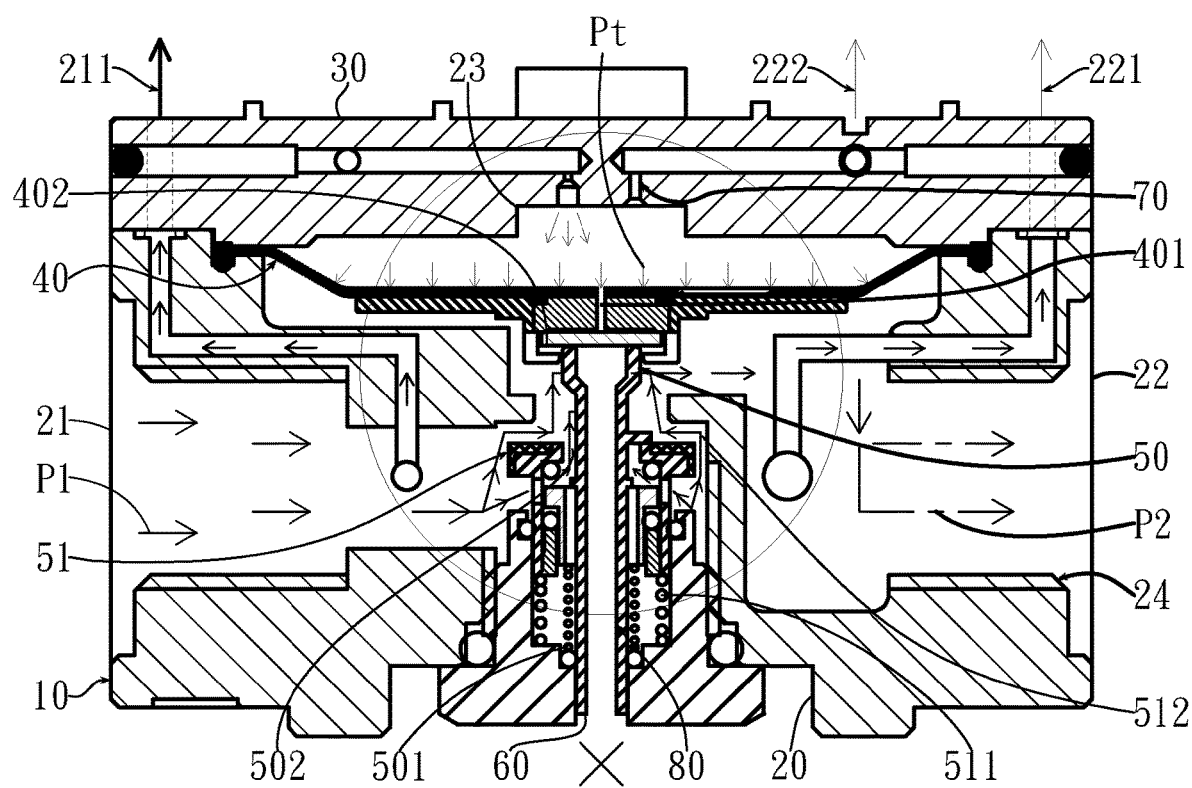
FIG. 7 is a schematic view illustrating second stage adjustment of the operation of the present invention.
Figure 8:
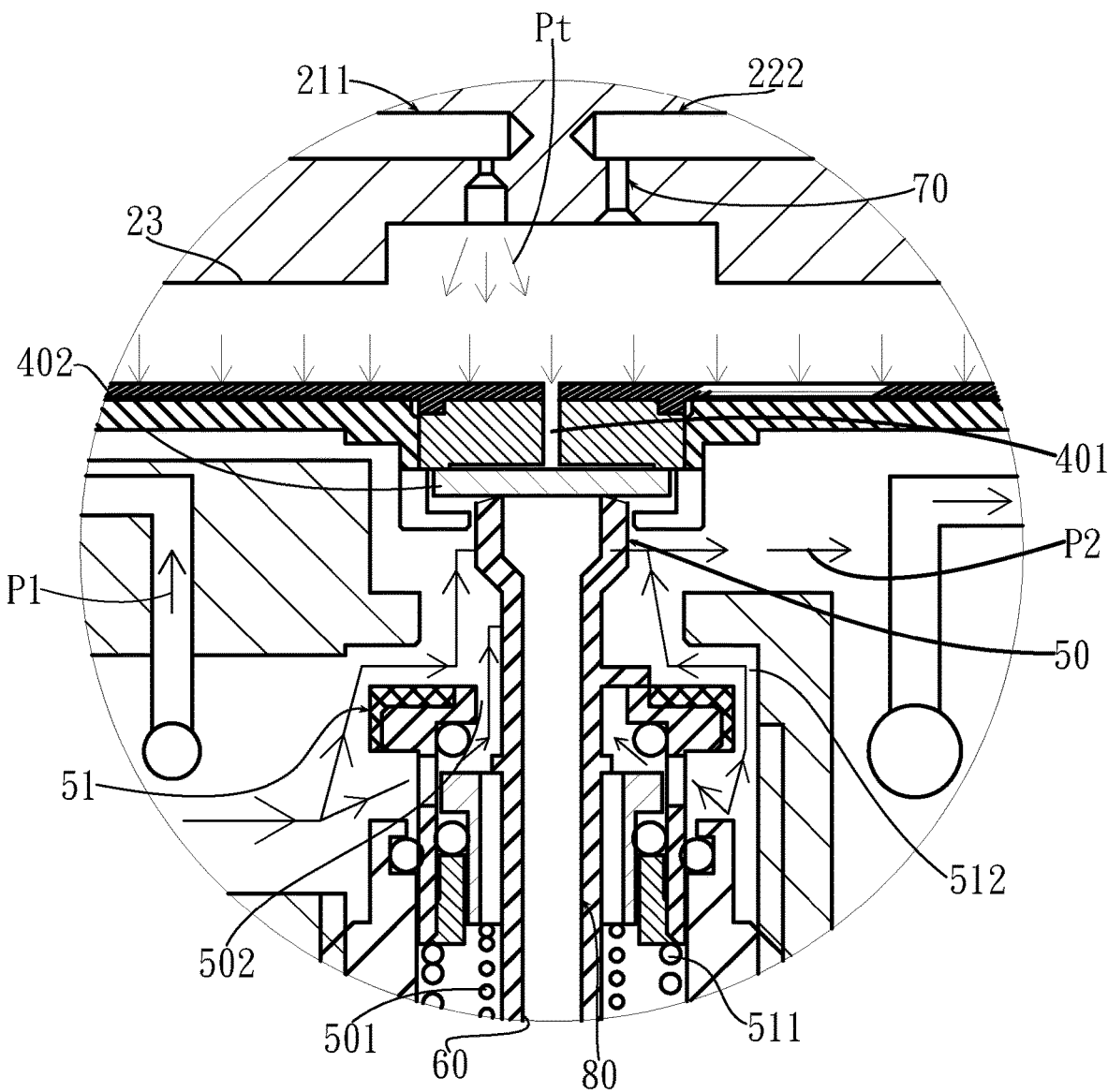
FIG. 8 is an enlarged view of a circled portion of FIG. 7.

Referring to FIGS. 7-8, in a second stage adjustment state after activation, the intake electromagnetic valve (PA) is in an open condition and the discharge electromagnetic valve (PB) is in a closed condition. When the primary side pressure (P1) is supplied to continuously increase, a downward force caused by the primary diaphragm (40) is increased and the straight rod (50) is driven further downward. Under such a condition, the first stage discharge structure (70) and the second stage discharge structure (80) are still closed, and the secondary entry opening (512) is additionally opened to increase the flowing speed of the fluid and thus increase the flow rate. In the second stage adjustment state, the secondary side pressure (P2) is kept larger than zero (>0), while the gas passage hole (60) below the straight rod (50) is in a closed condition.

Figure 9:
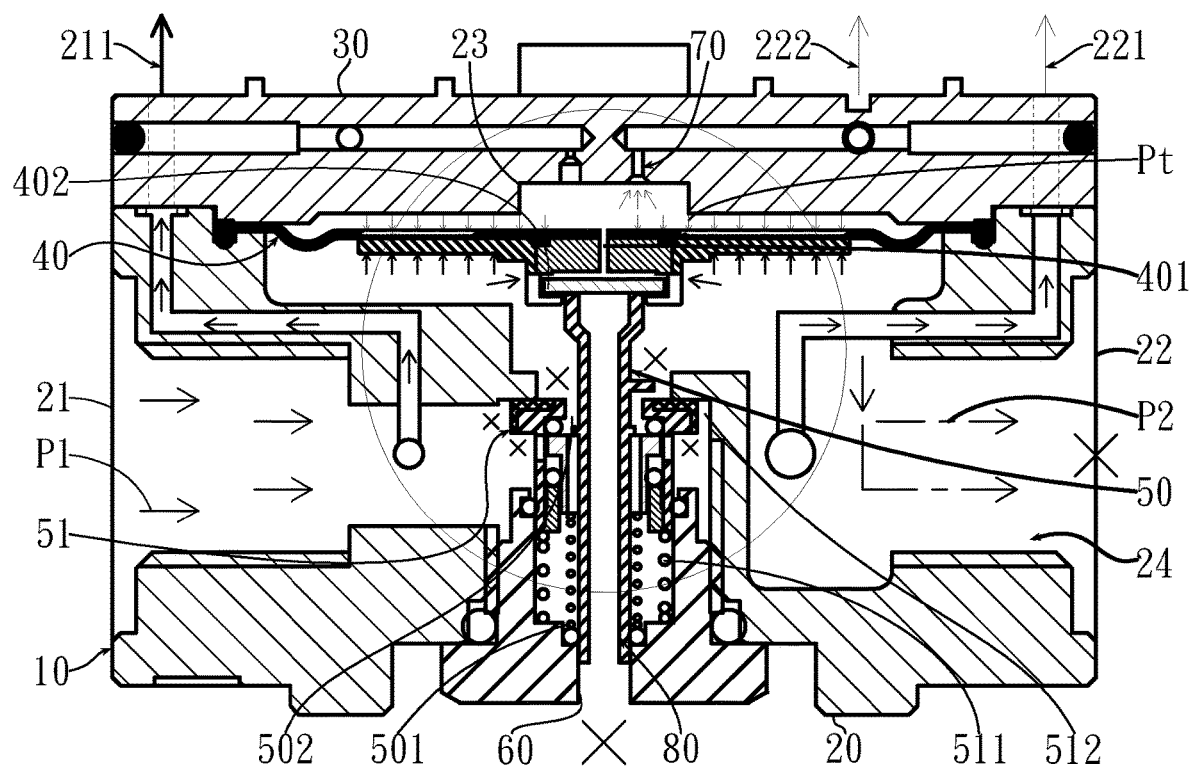
FIG. 9 is a schematic view demonstrating a pressure stabilized state of the operation of the preferred embodiment of the present invention.
Figure 10:
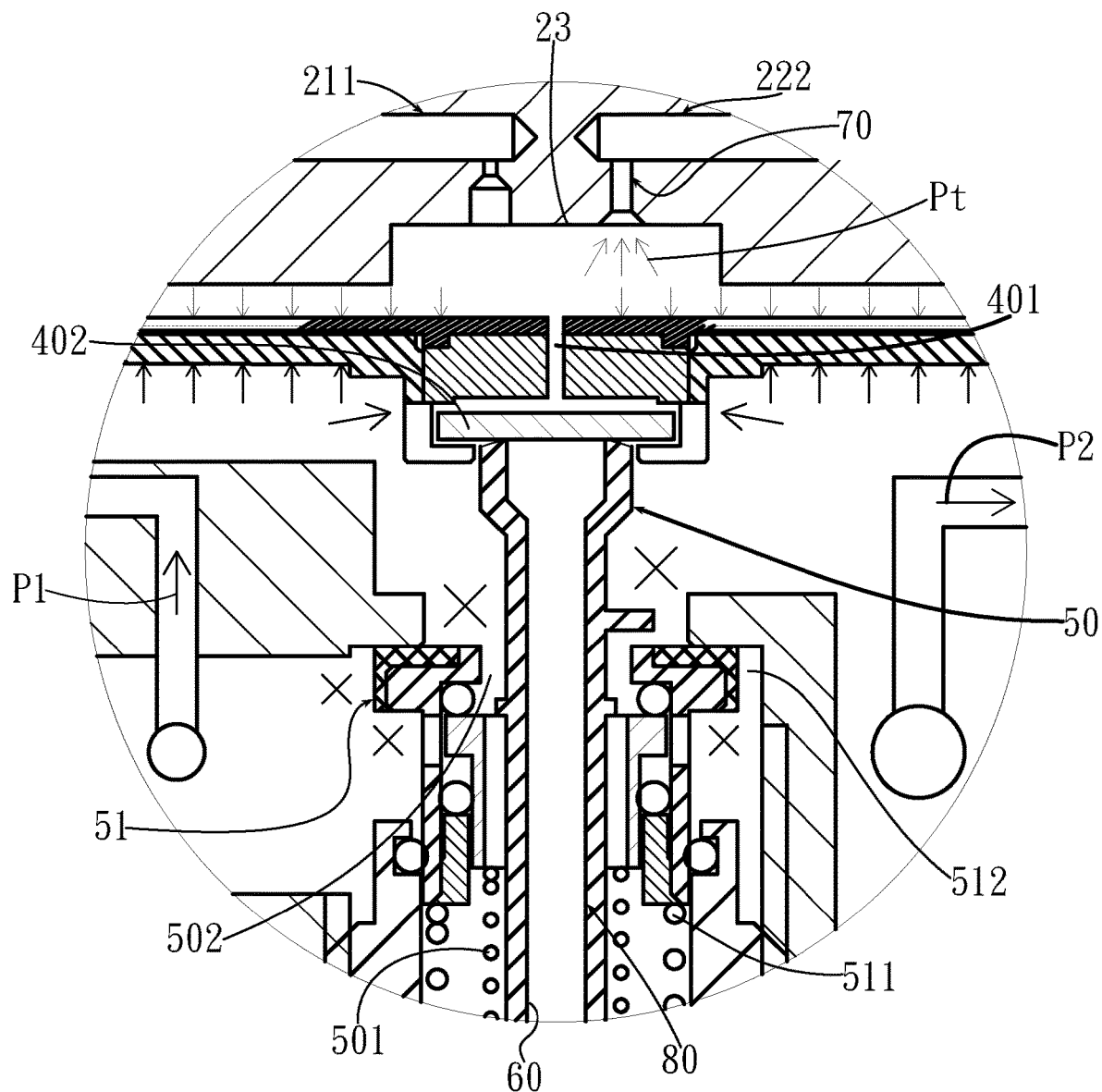
FIG. 10 is an enlarged view of a circled portion of FIG. 9.

Referring to FIGS. 9-10, in a pressure stabilized state, the intake electromagnetic valve (PA) is in a closed condition, and the discharge electromagnetic valve (PB) is in an open condition. In case of need for stabilization of pressure, the discharge electromagnetic valve (PB) is operated to open the primary diaphragm (40), the sealing pad (402), and the reversal prevention valve (401), so as to drive, via the discharge passage (222), the large gas hole (PB1) to allow a part of the balance pressure (Pt) to flow to the outside until a predetermined working pressure level set for the electrically controlled proportional valve (10) is reached. Under such a condition, the primary entry opening (502) and the secondary entry opening (512) are both in a closed condition. In the pressure stabilized state, the secondary side pressure (P2) is larger than zero (>0), but does not flow to the outlet end (22), and the gas passage hole (60) below the straight rod (50) is in a closed condition. More specifically, under this condition, an arrangement from the depressurization chamber (23), through the discharge passage (222), to the discharge electromagnetic valve (PB) is referred to as the first stage discharge structure (70), wherein when the first stage discharge structure (70) is opened, the discharge electromagnetic valve (PB) is allowed to completely control the rate of gas discharge for pressure releasing and the time period of response. Under such a condition, the control circuit (P) completely controls the result of pressure releasing so as to achieve a precise control of the output of the secondary side pressure (P2). After the adjustment of the pressure, the operation may go back to the standby state illustrated in FIGS. 3-4, wherein the primary diaphragm (40) and the sealing pad (402) are caused to move upward due to balance of inside pressure of the depressurization chamber (23). The secondary side pressure (P2) inside the valve seat (20) is discharged through the gas passage hole (60) that extends from a top end of the straight rod (50) to a lower end thereof. Under this condition, the rate of pressure releasing or depressurization is faster and the response time is also faster. The operation of this stage is referred to as the second stage discharge structure (80).

In summary, the present invention provides a two-stage intake and two-stage discharge structure of an electrically controlled proportional valve. A combination of a primary diaphragm (40) and a sealing pad (402) is used in combination with two-stage driving of a primary entry opening (502) and a secondary entry opening (512) provided on a straight rod (50) to carry out adjustment of opening/closing for two-stage intake, and a large gas hole (PB1) and a gas passage hole (60) are used to assist performance of two-stage discharge, so that the electrically controlled proportional valve (10) may achieve fast stabilization of pressure and accurate pressure regulation in a relatively short response time.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A two-stage intake and two-stage discharge structure of an electrically controlled proportional valve, comprising: a valve seat, which is formed in an interior thereof with a flow passage, the flow passage having an inlet end for ingress of primary side pressure and an outlet end for egress of secondary side pressure, the valve seat being provided, on a top side thereof, with an intake electromagnetic valve, a discharge electromagnetic valve, a throttle port, and a sensor; a depressurization chamber, which is formed as being sandwiched between a primary diaphragm that comprises a reversal prevention valve and a sealing pad and the valve seat, the depressurization chamber being provided with a guide hole passage that is controlled by the intake electromagnetic valve for connection with the inlet end, a discharge passage that is controlled by the discharge electromagnetic valve to release excessive pressure, and a sensing passage that is connected with the outlet end for detection conducted with the sensor; a straight rod, which is arranged at a center of an interior of the valve seat, the straight rod being sleeved on an outer surface thereof with a straight rod assembly, the straight rod being provided, on a lower side thereof, with a primary elastic element to form a primary entry opening, the straight rod assembly being provided with a secondary elastic element to form a secondary entry opening, so that the straight rod has an opening/closing arrangement that allows for intake of gas in a two-stage manner, wherein the sensor detects the secondary side pressure passing through the sensing passage, so that when a pressure in the outlet end is excessively low, the primary diaphragm drives the straight rod downward to carry out a first stage of adjustment, wherein the discharge electromagnetic valve carries out control of depressurization for regulating the secondary side pressure by means of the reversal prevention valve to thereby allow the primary entry opening to provide an accurate regulation of an output of the secondary side pressure; and when the primary diaphragm drives the straight rod further downward to carry out a second stage of pressure output, the secondary entry opening is opened to carry out large amount output of pressure to thereby speed up and stabilize output of the secondary side pressure.

2. The two-stage intake and two-stage discharge structure of the electrically controlled proportional valve according to claim 1, wherein the throttle port has a flow cross-sectional area that is smaller than a flow cross-sectional area of the intake electromagnetic valve, so that the primary side pressure entering the depressurization chamber increases a balance pressure at a stable speed, and the secondary side pressure on an opposite side of the primary diaphragm is allowed to fast balance with the balance pressure inside the depressurization chamber.

3. The two-stage intake and two-stage discharge structure of the electrically controlled proportional valve according to claim 1, further comprising: a first stage discharge structure, which is structured to extend from the depressurization chamber through the discharge passage to the discharge electromagnetic valve, the discharge electromagnetic valve being operable to completely control rate of discharge and interval of response time for depressurization, such that accurate output of the secondary side pressure is achieved; and a second stage discharge structure, which is structured as to a gas passage hole extending from a top end of the straight rod to a lower end, wherein the second stage discharge structure provides a rate of depressurization that is greater than the first stage discharge structure, so that the first stage discharge structure and the second stage discharge structure collectively make the interval of response for depressurization shorter to achieve the purpose of gas discharge and pressure stabilization.

* * * * *